United States Patent [19]
Tanimoto et al.

[11] Patent Number: 5,510,662
[45] Date of Patent: Apr. 23, 1996

[54] PERMANENT MAGNET MOTOR

[75] Inventors: Shigeya Tanimoto, Aichi; Mayumi So, Kakamigahara, both of Japan

[73] Assignee: Kabushiki Kaisha Toshiba, Kanagawa, Japan

[21] Appl. No.: 249,026

[22] Filed: May 25, 1994

[30] Foreign Application Priority Data

| May 26, 1993 | [JP] | Japan | 5-124129 |
| May 26, 1993 | [JP] | Japan | 5-124130 |
| May 26, 1993 | [JP] | Japan | 5-124134 |

[51] Int. Cl.$^6$ .................................................. H02K 21/12
[52] U.S. Cl. ............................................................. 310/156
[58] Field of Search ............................ 310/156, 261, 310/262, 264, 265, 267, 269, 216, 218

[56] References Cited

U.S. PATENT DOCUMENTS

| 1,543,347 | 6/1925 | Turner et al. | 310/156 |
| 2,939,025 | 5/1960 | Williford, Jr. | 310/156 |
| 4,110,646 | 8/1978 | Rao | 310/156 X |
| 4,725,750 | 2/1988 | Welch | 310/156 |
| 4,845,837 | 7/1989 | Lloyd | 310/216 X |
| 4,924,130 | 5/1990 | Fratta | 310/261 |
| 5,191,256 | 3/1993 | Reiter, Jr. et al. | 310/156 |

FOREIGN PATENT DOCUMENTS

| 508841 | 1/1920 | France | 310/156 |
| 6-38415 | 2/1994 | Japan | 310/156 |

OTHER PUBLICATIONS

IEEE Transactions on Power Apparatus and System, vol. PAS–101, No. 4 Apr. 1982, V. B. Honsinger, "The Field And Parameters Of Interior Type AC Permanent Magnet Machines".

Siemens Review XLIII (1976). No. 6 Wolfgang Volkrodt "Machines Of Medium–High Rating With A Ferrite–Magnet Field".

*Primary Examiner*—Mark O. Budd
*Attorney, Agent, or Firm*—Cushman Darby & Cushman

[57] ABSTRACT

In a permanent magnet motor, a stator includes an annular stator core and a plurality of stator windings wound on the stator core so that a plurality of phases are composed. A rotor is rotatably mounted with a predetermined air gap between it and an inner peripheral face of the stator core. The rotor includes a rotor core having a plurality of slots and a plurality of permanent magnets embedded in the slots respectively. Each permanent magnet having a generally arc-shaped cross section is embedded in the slot so that its convex portion is directed toward a rotor axis. Each permanent magnet is magnetized so that directions of easy magnetization are concentrated on a point C at a side of center of curvature thereof. The relation between a distance L between the point C and a center line passing the center of each permanent magnet in the direction of the thickness thereof and a mean radius of curvature R of the permanent magnets is shown by the expression, $1.0 \times R \leq L \leq 7.5 \times R$.

2 Claims, 13 Drawing Sheets

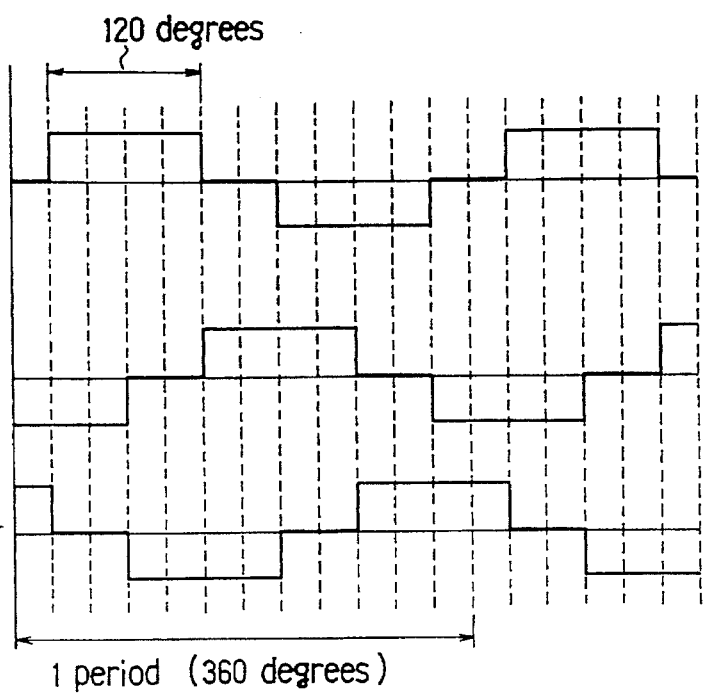
FIG.18A Phase U PRIOR ART
FIG.18B Phase V PRIOR ART
FIG.18C Phase W PRIOR ART
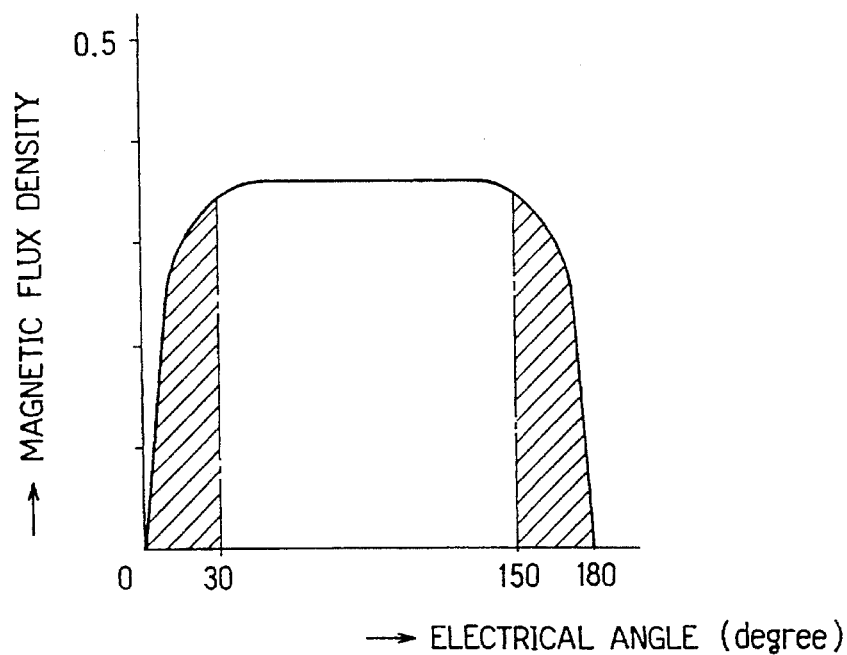
FIG.19 PRIOR ART

PERMANENT MAGNET MOTOR

BACKGROUND OF THE INVENTION

1. Field of the Invention

This invention relates to a permanent magnet motor wherein a rotor comprises a rotor core having a plurality of permanent magnets disposed in the interior thereof.

2. Description of the Prior Art

High-power and high-efficiency permanent magnet motors have recently been developed. FIG. 13 shows an arrangement of a stator and a rotor in one of such recently developed permanent magnet motors. A stator 1 comprises a stator core 2 having twelve slots formed therein. Stator windings 1U and 2U of phase U, stator windings 1V and 2V of phase V and stator windings 1W and 2W of phase W are disposed in the slots. A rotor 4 comprises a rotational shaft 5 and a rotor core 6 mounted on the shaft 5, as shown in FIG. 14. The rotor core 6 has four magnet receiving slots 7 formed therein. Four permanent magnets 8 each having an arc-shaped cross section are inserted into the respective magnet receiving slots 7 axially of the rotor core 6 so that a convex side 8a of each permanent magnet 8 is positioned at the outer peripheral side of the rotor core 6. The permanent magnets 8 are so polarized that the north and south poles N and S are arranged alternately. The rotor 4 composed as described above is rotatably mounted on bearings (not shown) and separated from the stator 1 by a predetermined air gap 9.

FIGS. 15 and 16 show magnetic anistropy of the permanent magnet 8. FIG. 15 shows the case where easy magnetization directions B at portions of the permanent magnet 8 are radially concentrated on the center A of the rotor 4. FIG. 16 shows the case where the easy magnetization directions B are substantially parallel to one another and concentrated on a point at infinity. These anistropic characteristics of the permanent magnet are selected according to various applications of the permanent magnet motor.

FIG. 17 shows an inverter controlled power source for the permanent magnet motor. A DC power source 10 is connected to a switching main circuit 11. The switching main circuit 11 comprises three arms 11U, 11V and 11W connected into a three-phase bridge configuration. Each of the arms 11U, 11V, 11W is composed of two transistors 12 and two diodes 13. Nodes of the three pairs of transistors 12 are connected to output lines Ua, Va, Wa of motor phases U, V and W respectively. The output lines Ua, Va, Wa are further connected to stator windings 1U and 2U, 1V and 2V and 1W and 2W, respectively.

The switching main transistors 12 are controlled by a control circuit 14 so that the stator windings 1U, 2U, 1V, 2V, 1W and 2W are energized for energization periods each of which is represented by an electrical angle of 180 degrees or 120 degrees (see FIG. 18), for example. Furthermore, a rotational position detector 15 is provided for detecting a rotational position of the rotor 4, thereby generating a rotational position signal. The rotational position signal is supplied to the control circuit 14, which then obtains a motor drive signal in accordance with the supplied rotational position signal.

In the above-described permanent magnet motor, square or trapezoidal magnetic flux distribution is obtained in the air gap 9 between the stator 1 and the rotor 4. Motor torque T is developed only while a current is flowing in the stator winding as well known in the art and is shown by the following expression (1):

$$T = m \times K \times B \times I \tag{1}$$

where m is the number of phases of the stator winding, K is a constant with respect to the number of turns of the stator winding, B is the magnetic flux density in the air gap, and I is a winding current. The magnetic flux of the permanent magnet 8 per pole contributes to the motor torque when the stator windings are sequentially energized for the respective periods of 180 degrees, for example. Accordingly, the magnetic flux per pole in the air gap 9 influences the motor performance.

The magnetic flux in the air gap 9 cannot be increased so much in the above-described construction, so that the driving torque of the motor is relatively low. This poses limitation to miniaturization of the motor or an improvement of the drive efficiency. Consequently, permanent magnet machines employing the permanent magnet motors are increased in size.

When the stator windings are sequentially energized for the respective periods of 120 degrees, part of the magnetic flux of the permanent magnet 8 per pole, which corresponds to the electrical angle of 120 degrees, contributes to the motor torque. FIG. 19 shows distribution of the magnetic flux density in the air gap 9 in the prior art. As shown, the magnetic flux caused in the air gap 9 in non-energization periods does not contribute to the driving torque of the motor. The non-energization periods are shown by oblique lines and correspond to the period between the electrical angles of 0 and 30 degrees and the period between the electrical angles of 150 and 180 degrees. Accordingly, the magnetic flux caused by the permanent magnets 8 is not effectively used, which reduces the driving torque of the motor. Consequently, the miniaturization of the motor and the improvement of the drive efficiency are limited.

Furthermore, third, fifth and seventh higher harmonic components are contained in the magnetic flux caused in the air gap 9. Since the configuration of the rotor core 6 reducing the higher harmonic components is limited, the freedom in designing the permanent magnet motor is reduced and the use of the motor is limited. Thus, the higher harmonic components contained in the magnetic flux cannot be easily reduced.

The higher harmonic components contained in the magnetic flux produces higher harmonic energy components in the air gap 9. A so-called cogging torque is developed by the interaction of the higher harmonic energy components and an opening 3a of each slot 3 of the stator core 3. The cogging torque is superimposed on the torque developed by the magnetic flux caused by the fundamental component but does not serve as effective driving torque. Rather, the cogging torque serves to oscillate rotor 4 and the resultant oscillation is transferred to the motor frame or the equipment driven by the motor, producing undesirable oscillation or noise.

SUMMARY OF THE INVENTION

Therefore, an object of the present invention is to provide an improved permanent magnet motor wherein a rotor comprises a rotor core having a plurality of permanent magnets embedded therein and wherein the magnetic flux density in the air gap between the stator and the rotor can be increased with the result of increase in the driving torque, so that the motor can be miniaturized and the motor efficiency can be improved.

Another object of the present invention is to provide the permanent magnet motor wherein the higher harmonic components contained in the magnetic flux caused in the air gap between the stator and the rotor can be reduced so that the cogging torque producing undesirable oscillation and noise can be reduced.

In one aspect, the present invention provides a permanent magnet motor comprising a stator including an annular stator core and a plurality of stator windings wound on the stator core so that a plurality of phases are composed and a rotor rotatably mounted with a predetermined air gap between the same and an inner peripheral face of the stator core, the rotor including a rotor core having a plurality of slots and a plurality of permanent magnets embedded in the slots respectively, the rotor being rotated when the stator windings are sequentially energized. Each permanent magnet has a generally arc-shaped cross section and is embedded in the slot of the rotor core so that a convex portion thereof is directed toward a rotor axis. Each permanent magnet is magnetized so that directions of easy magnetization thereof are concentrated on a point C at a side of center of curvature thereof. The relation between a distance L between the point C and a center line passing the center of each permanent magnet in the direction of the thickness thereof and a mean radius of curvature R of the permanent magnets is shown by the following expression:

$$1.8 \times R \leq L \leq 5 \times R$$

According to the above-described permanent magnet motor, the flux density in the air gap between the stator and the rotor can be increased as obvious from the experimental results shown in FIG. 3. Consequently, since the driving torque can be increased, the motor can be miniaturized and the motor efficiency can be improved.

In another aspect, the invention provides a permanent magnet motor comprising a stator including an annular stator core and a plurality of stator windings wound on the stator core so that a plurality of phases are composed and a rotor rotatably mounted with a predetermined air gap between the same and an inner peripheral face of the stator core, the rotor including a rotor core having a plurality of slots and a plurality of permanent magnets embedded in the slots respectively, the rotor being rotated when the stator windings are sequentially energized. Each permanent magnet has a generally arc-shaped cross section and is embedded in the slot of the rotor core so that a convex portion thereof is directed toward a rotor axis. Each permanent magnet is magnetized so that directions of easy magnetization thereof are concentrated on a point C at a side of center of curvature thereof. The relation between a distance L between the point C and a center line passing the center of each permanent magnet in the direction of the thickness thereof and a mean radius of curvature R of the permanent magnets is shown by the following expression:

$$0.4 \times R \leq L \leq 0.9 \times R.$$

According to the above-described permanent magnet motor, the third higher harmonic component can be reduced from the magnetic flux in the air gap between the stator and the rotor, as obvious from the experimental resultant shown in FIG. 12. Consequently, since the cogging torque producing undesirable oscillation and noise can be reduced.

BRIEF DESCRIPTION OF THE DRAWINGS

Other objects, features and advantages of the present invention will become clear upon reviewing the following description of preferred embodiments thereof, made with reference to the accompanying drawings, in which:

FIG. 18 is a timing chart for energization of stator windings in the prior art when they are energized in periods of electrical angle of 120 degrees respectively; and FIG. 19 is a graph similar to FIG. 8 in the prior art.

DESCRIPTION OF THE PREFERRED EMBODIMENTS

Figure 1:
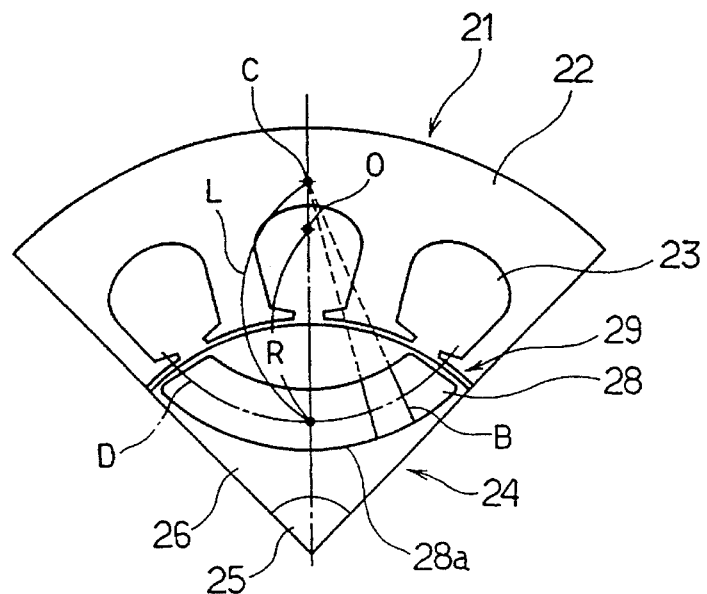
FIG. 1 is a diagrammatic view of part of an assembly of a stator and a rotor employed in a first embodiment of a permanent magnet motor in accordance with the present invention, the view helping to understand the relation between a distance L between the point C and a center line D passing the center of each permanent magnet in the direction of the thickness thereof and a mean radius of curvature R of the permanent magnets.

A first embodiment of the present invention will be described with reference to FIGS. 1 to 3 of the accompanying drawings. In the first embodiment, the invention is applied to a three-phase four pole permanent magnet motor.

Figure 2:
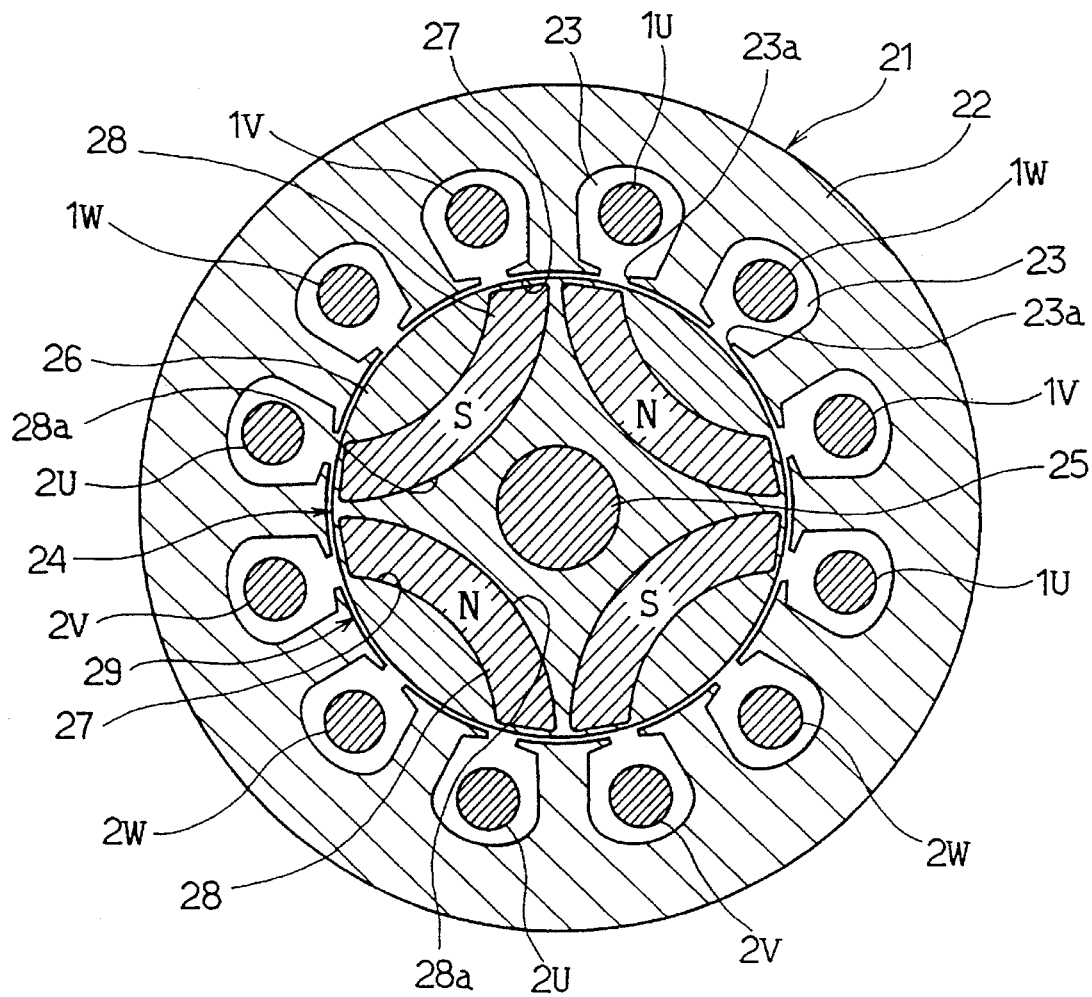
FIG. 2 is a longitudinally sectional view of the stator and the rotor of the permanent magnet motor.

Referring to FIG. 2, a stator 21 of the permanent magnet motor is constructed in the same manner as in the prior art. The stator 21 comprises an annular stator core 22 having twelve slots 23 formed therein. Stator windings 1U and 2U of phase U, stator windings 1V and 2V of phase V and stator windings 1W and 2W of phase W are embedded in the slots 23. Each slot 23 has an opening 23a formed in an inner periphery of the stator core 22.

A rotor 24 of the permanent magnet motor comprises a rotational shaft 25 and a rotor core 26 mounted on the shaft 25. The rotor core 26 has four magnet receiving slots 27 extending axially. The rotor core 26 is formed by number of silicon steel plates each having openings forming the slots 27. Four permanent magnets 28 each formed of ferrite are embedded in the slots 27 respectively. Each permanent magnet 28 has a generally arc-shaped cross-section. In the embodiment, each permanent magnet 28 has a circular arc-shaped cross-section. The shaft 25 of the rotor 24 is rotatably mounted on bearings (not shown) so that a predetermined air gap 29 is defined between the inner periphery of the stator core 22 and the outer periphery of the rotor core 26.

Each permanent magnet 28 is embedded in the magnet receiving slot 27 so that its convex side is directed to an axis of rotation of the rotor 24 or the rotational shaft 25. The four permanent magnets 28 are so polarized that the north and south poles N and S are arranged alternately. Each permanent magnet 28 is magnetized so that directions of easy magnetization thereof are concentrated on a point C (see FIG. 1) at a side of center O of curvature thereof on an imaginary line between the center O of curvature and the axis of rotation of the rotor 24. A distance L between the point C and a center line D passing the center of each permanent magnet in the direction of the thickness thereof and a mean radius R of curvature of the permanent magnets are so set as to fulfill the expression, $1.0 \times R \leq L \leq 7.5 \times R$.

The permanent magnet motor constructed as described above is fed with electric power from an inverter controlled power source (see FIG. 17) in the same manner as in the prior art. For example, the stator windings 1U and 2U, 1V and 2V, and 1W and 2W are sequentially energized in respective periods of electrical angle of 180 degrees, whereby a rotating magnetic field is induced and resultant magnetic attractive and repulsive forces cause the rotor 24 to rotate.

Figure 3:
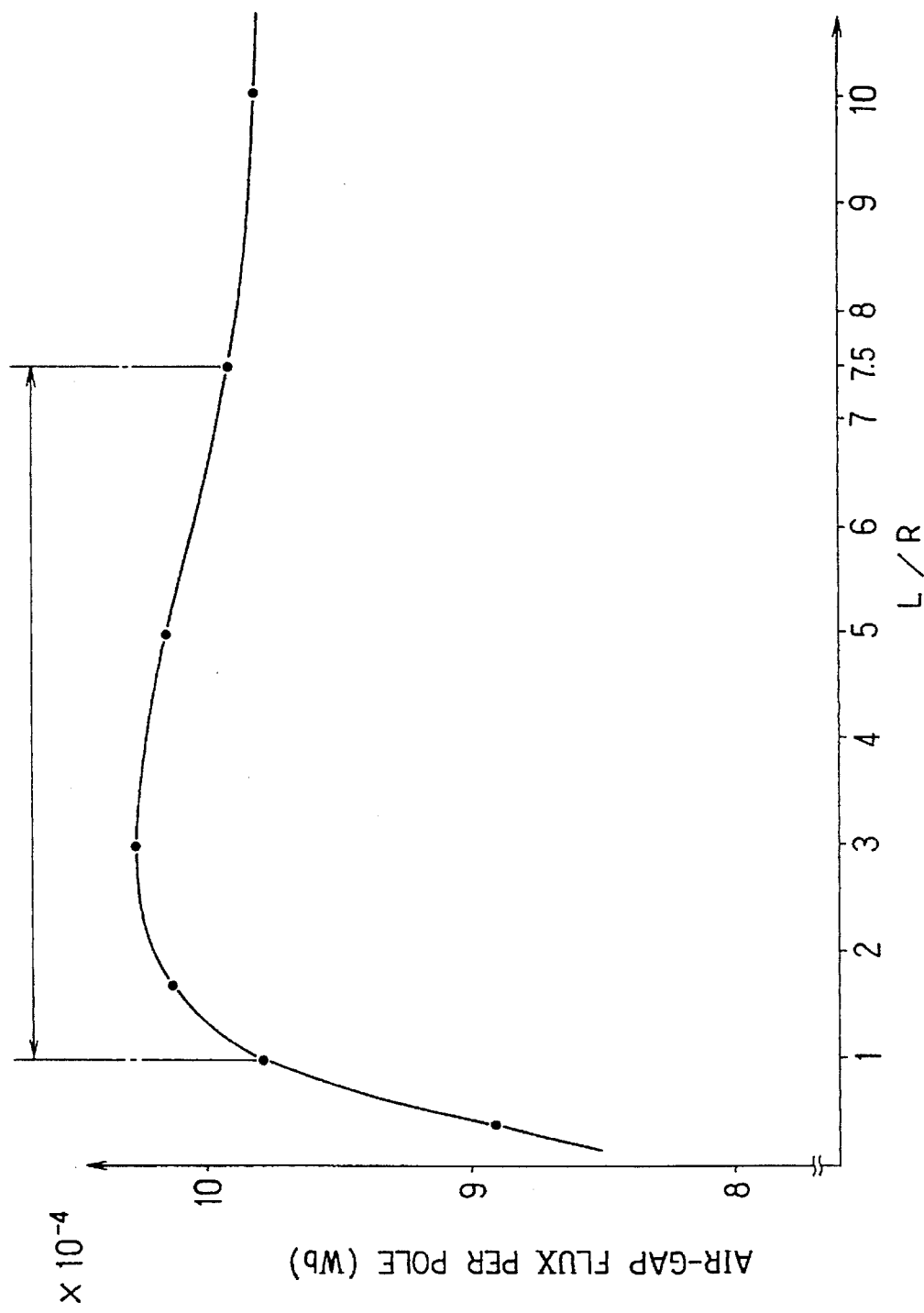
FIG. 3 is a graph showing the relation between a ratio L/R and the magnetic flux caused in an air gap between the stator and the rotor.

FIG. 3 shows the experimental results about the relation between a ratio L/R of the distance L to the mean radius R of curvature and the magnetic flux caused in the air gap 29 per pole in the above-described permanent magnet motor. As obvious from FIG. 3, the magnetic flux caused in the air gap 29 can be increased when the ratio L/R takes the value in the range between 1.0 and 7.5. Accordingly, the driving torque can be increased when the ratio L/R is so set as to take the value in the range between 1.0 and 7.5 or when the distance L and the mean radius R of curvature are so set as to fulfill the expression, $1.0 \times R \leq L \leq 7.5 \times R$. Consequently, the size of the permanent magnet motor can be rendered small and the motor efficiency can be improved. In the above-described construction, the magnetic flux in the air gap 29 can also be increased as compared with the case where the easy magnetization directions are parallel to one another and concentrated on a point at infinity.

Figure 4:
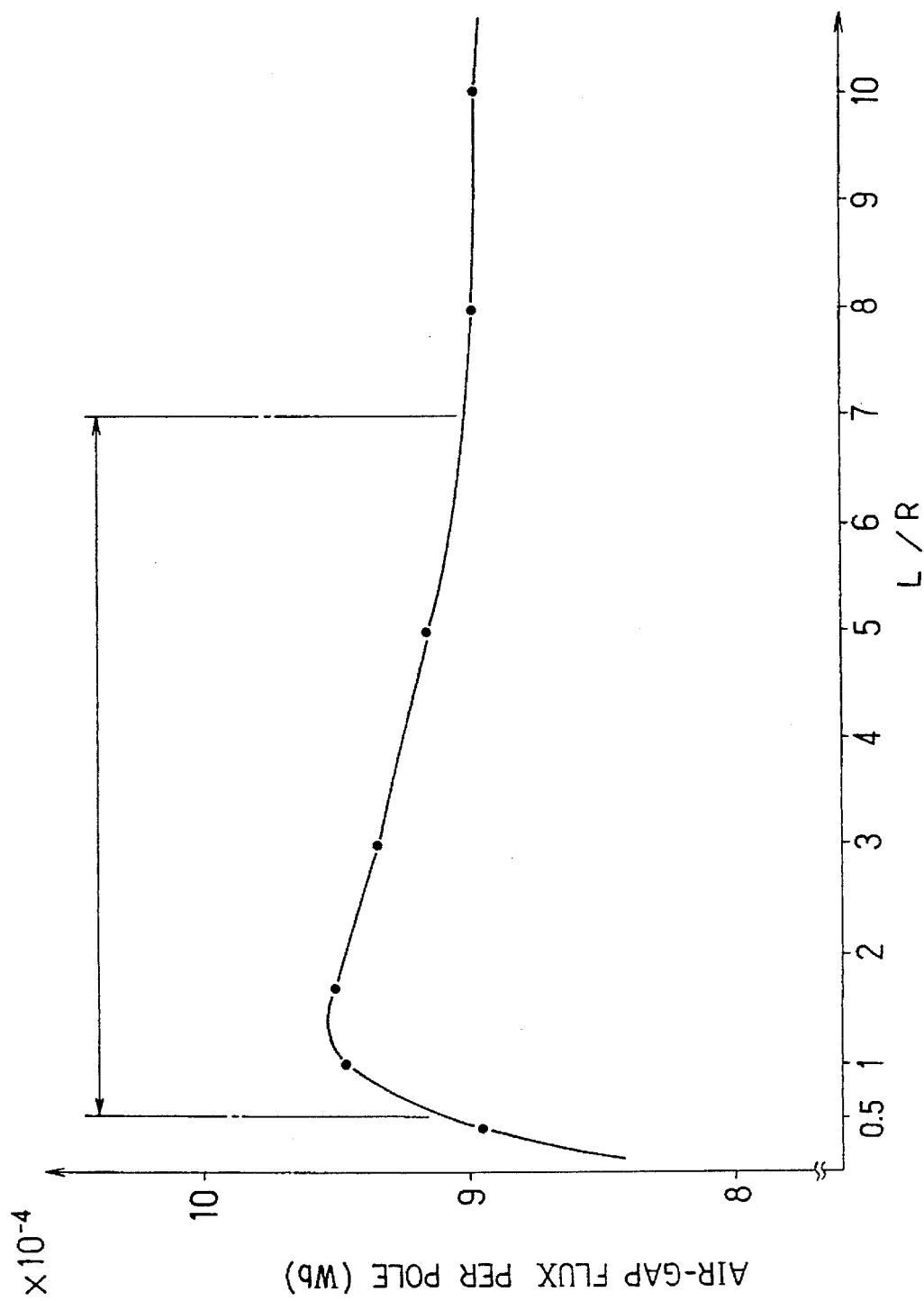
FIG. 4 is a graph similar to FIG. 3 showing a second embodiment of a permanent magnet motor in accordance with the present invention.

FIG. 4 shows a second embodiment of the present invention. In the second embodiment, a plurality of stator windings are wound on the stator core 22 so that 3n phases are composed where n is a natural number. In the case of the 3n phases, magnetic fluxes of third, ninth and fifteenth higher harmonics are not effective in the magnetic flux in the air gap 29. The magnitude of the magnetic flux caused in the air gap 29 shown in FIG. 4 corresponds to the value obtained by eliminating these higher harmonic components from the magnitude of the magnetic flux shown in FIG. 3 by calculation.

FIG. 4 shows that the magnetic flux caused in the air gap 29 can be increased in the case of 3n phases when the ratio L/R takes the value in the range of 0.5 to 7.0. Accordingly, the driving torque can be increased when the ratio L/R is so set as to take the value in the range between 0.5 and 7.0 or when the distance L and the mean radius R of curvature are so set as to fulfill the expression, $0.5 \times R \leq L \leq 7.0 \times R$. Consequently, the size of the permanent magnet motor can be rendered small and the motor efficiency can be improved. In the second embodiment, too, the magnetic flux in the air gap 29 can be increased as compared with the case where the easy magnetization directions are parallel to one another and concentrated on a point at infinity.

Figure 5:
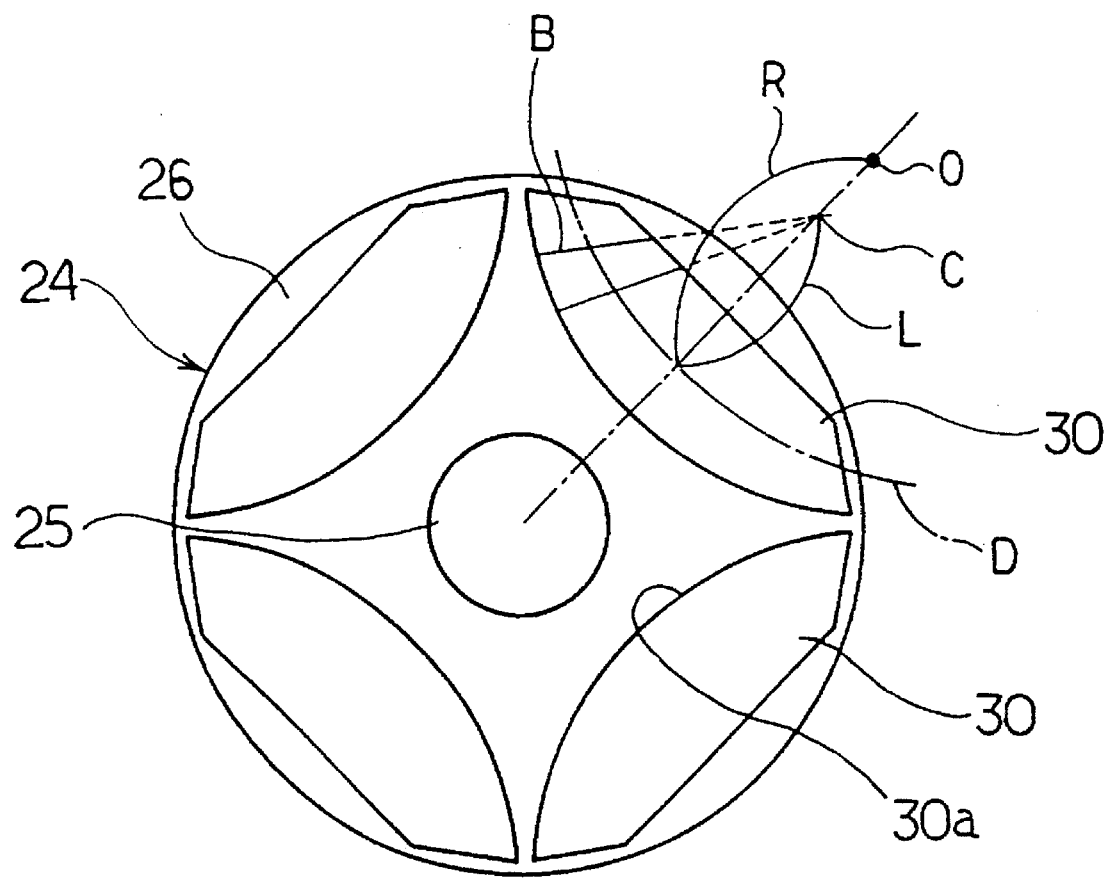
FIG. 5 is a side view of a rotor employed in a third embodiment of a permanent magnet motor in accordance with the present invention.
Figure 6:
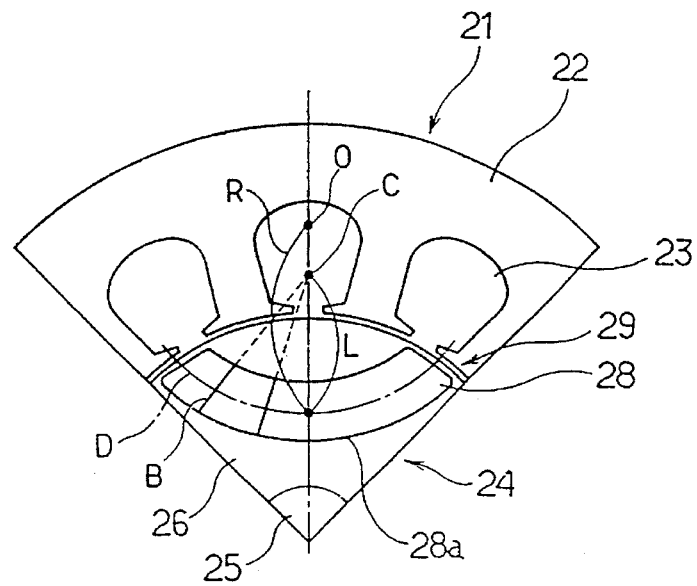
FIG. 6 is a view similar to FIG. 1 showing a fourth embodiment of a permanent magnet motor in accordance with the present invention.
Figure 7:
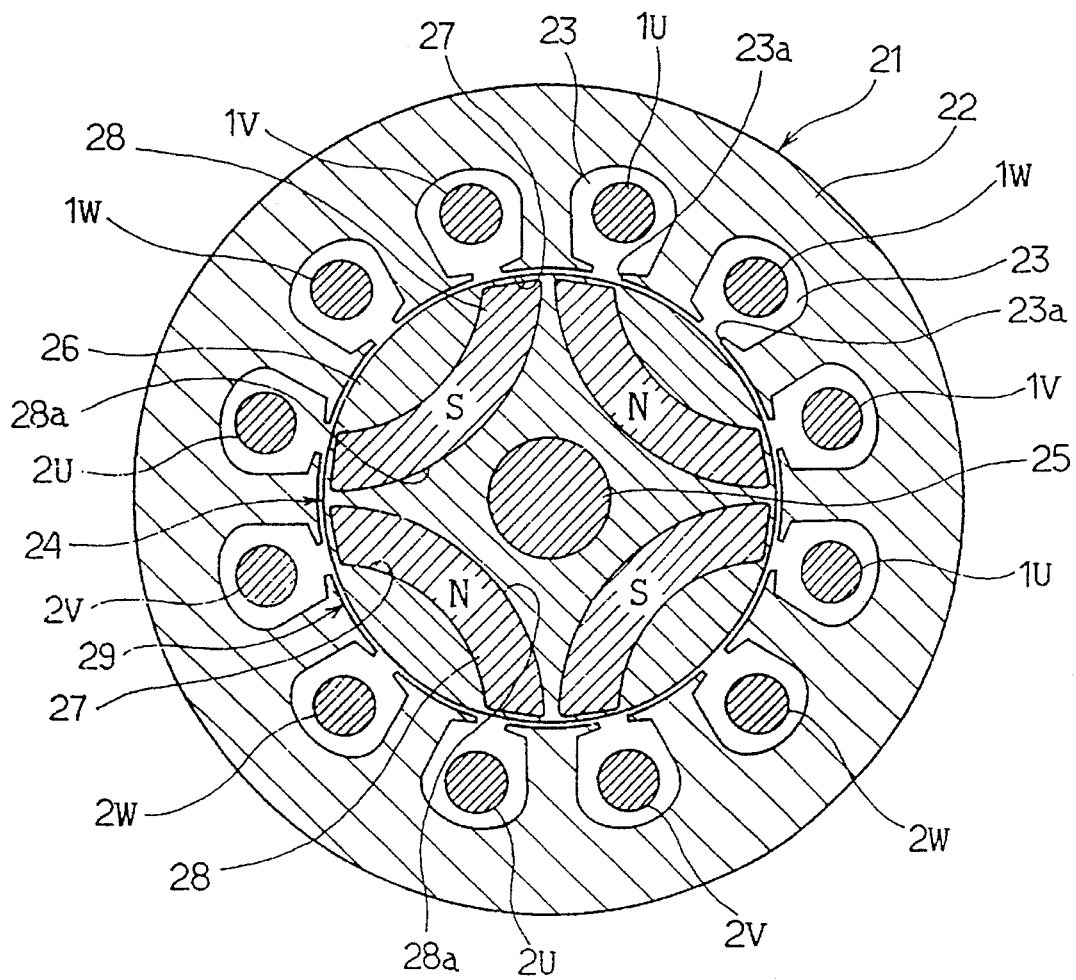
FIG. 7 is a view similar to FIG. 2 showing the stator and the rotor of the permanent magnet motor of the fourth embodiment.

FIG. 5 shows a third embodiment of the invention. Each of the permanent magnets 30 of the rotor 24 has the arc-shaped portion and a straight portion opposite the arc-shaped portion. Each permanent magnet 30 is embedded in the slot 27 so that its convex side 30a is directed to the axis of rotation of the rotor 24 or the rotational shaft 25. In the third embodiment, too, the mean radius R of curvature is set on the basis of a mean thickness of the permanent magnet 30. Each permanent magnet 30 is magnetized so that directions of easy magnetization thereof are concentrated on the point C at the side of center O of curvature thereof on the imaginary line between the center O of curvature and the axis of rotation of the rotor 24. The distance L between the point C and the center line D passing the center of each permanent magnet in the direction of the thickness thereof and a mean radius R of curvature of the permanent magnets are set in the same manner as in the first or second embodiment. Consequently, the same effect can be achieved in the third embodiment as in the first or second embodiment.

FIGS. 6 to 9 illustrate a fourth embodiment of the invention. In the fourth embodiment, the distance L between the point C and the center line D passing the center of each permanent magnet 28 in the direction of the thickness thereof and the mean radius R of curvature of the permanent magnets 28 are so set as to fulfill the expression, $0.25 \times R \leq L \leq 6.0 \times R$.

Figure 17:
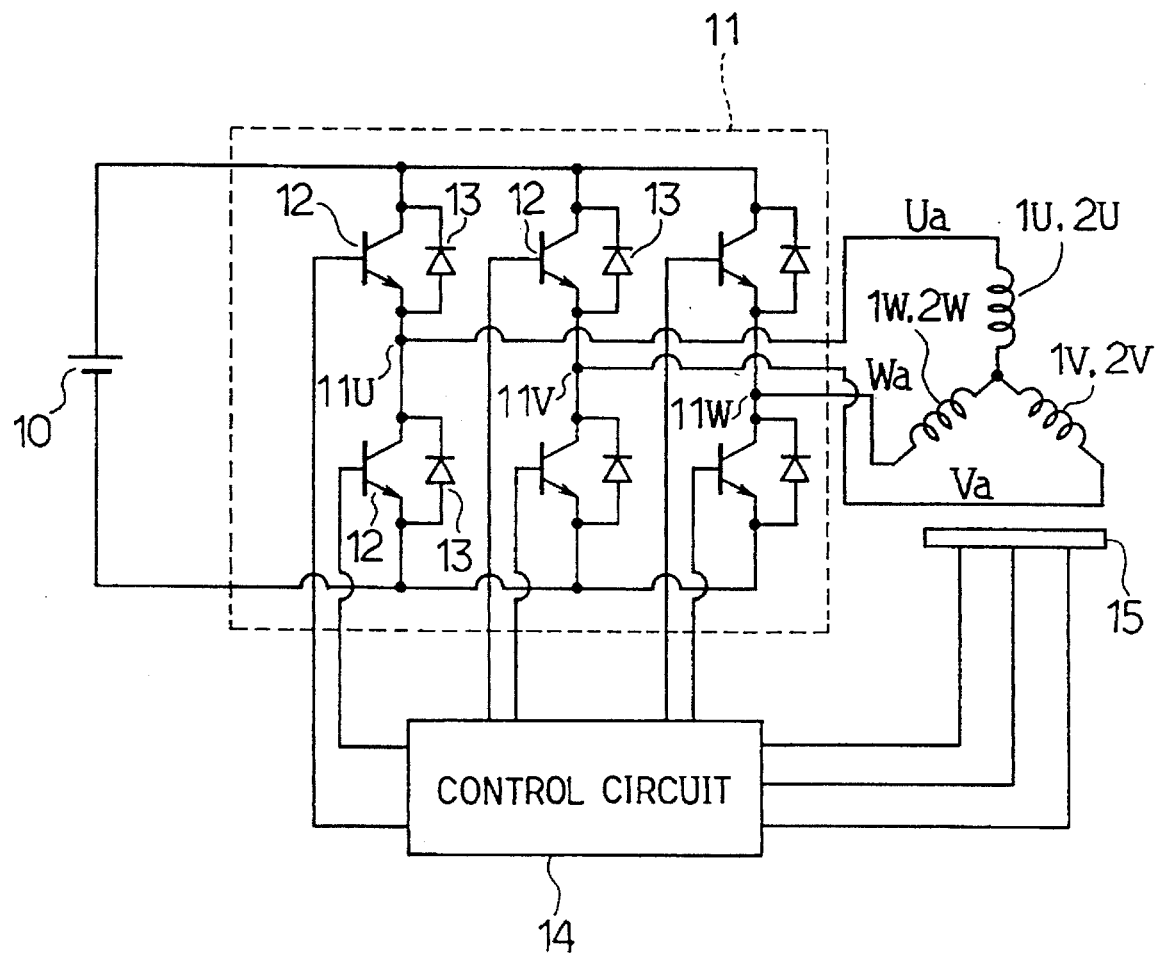
FIG. 17 is a circuit diagram of an inverter controlled power source for the conventional permanent magnet motor.

The permanent magnet motor constructed as described above is fed with electric power from the inverter controlled power source (see FIG. 17). The stator windings 1U and 2U, 1V and 2V, and 1W and 2W are sequentially energized in the respective periods of electrical angle of 120 degrees, whereby the rotating magnetic field is induced and resultant magnetic attractive and repulsive forces cause the rotor 24 to rotate.

Figure 8:
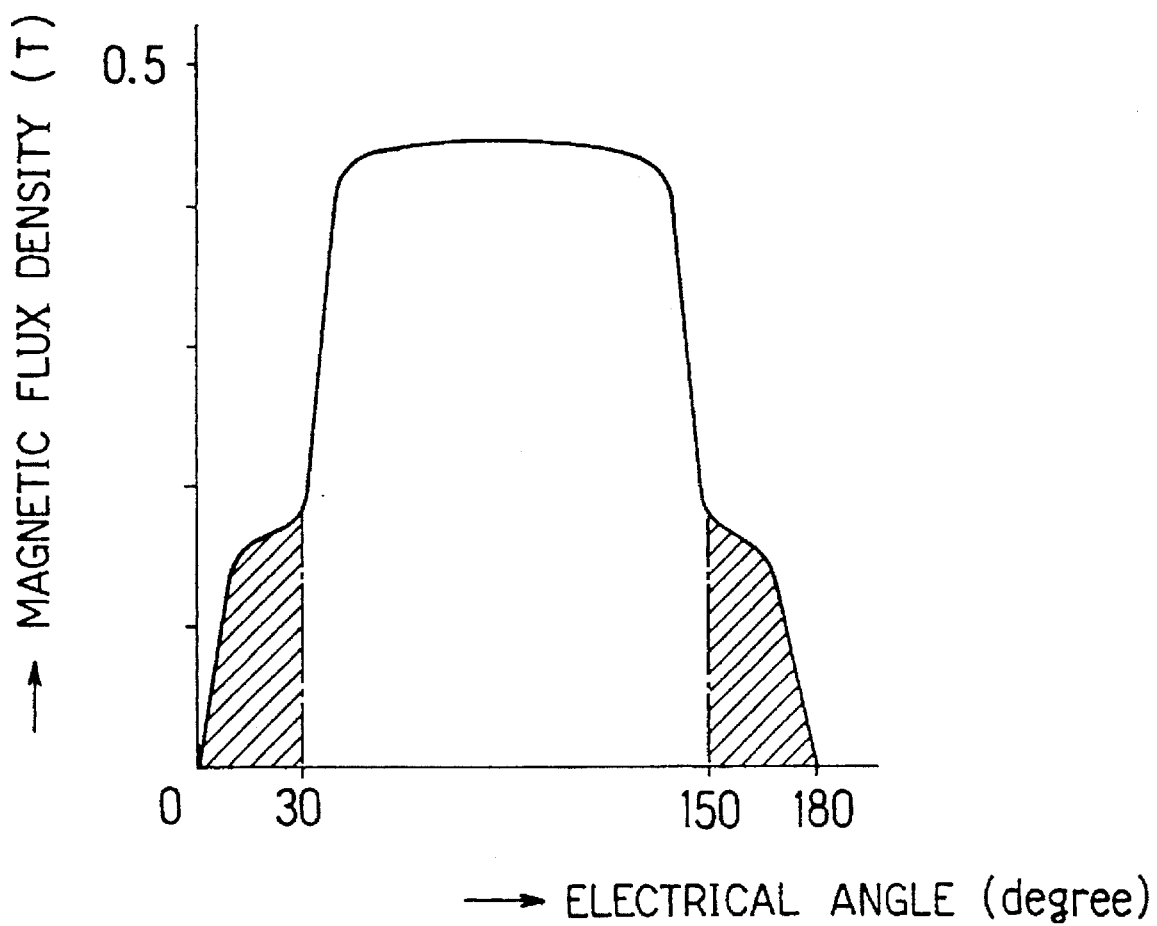
FIG. 8 is a graph showing the distribution of magnetic flux density in the air gap per pole.

FIG. 8 shows the distribution of the magnetic flux caused in the air gap 29 by the permanent magnets 28. In the fourth embodiment, the magnetic flux is decreased in non-energizing periods shown by oblique lines which are a period of 0 to 30 degrees and a period of 150 to 180 degrees while the magnetic flux is increased in the energizing period of 30 to 150 degrees.

Figure 9:
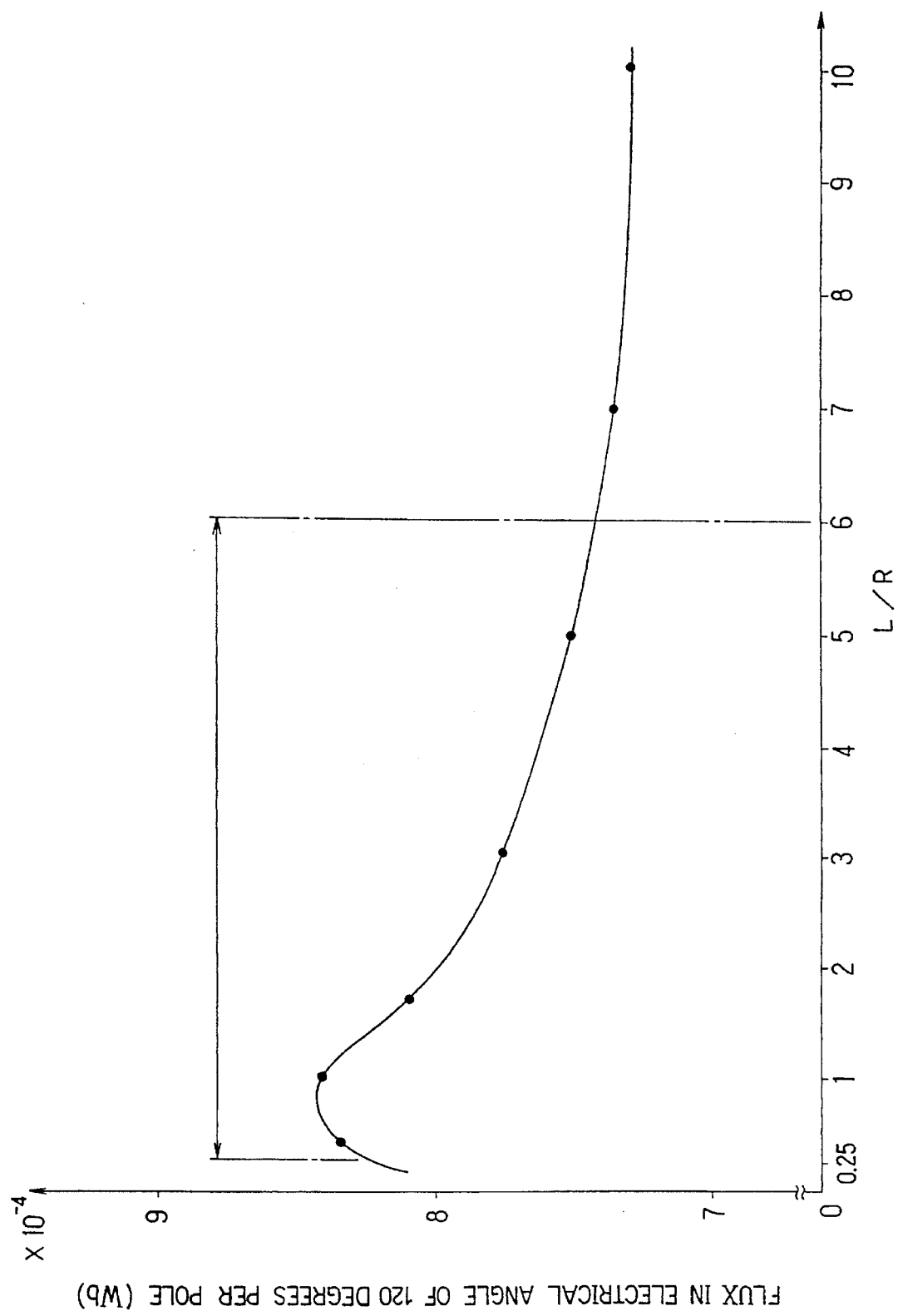
FIG. 9 is a graph showing the relation between the ratio L/R and the magnetic flux in the range of electrical angle of 120 degrees per pole.

FIG. 9 shows the experimental results about the relation between the ratio L/R of the distance L to the mean radius R of curvature and the magnetic flux caused in the air gap 29 in the period of 120 degrees per pole in the above-described permanent magnet motor of the fourth embodiment. As obvious from FIG. 9, the magnetic flux caused in the air gap 29 can be increased when the ratio L/R takes the value in the range between 0.25 and 6.0. In the fourth embodiment, too, the magnetic flux in the air gap 29 can be increased as compared with the case where the easy magnetization directions are parallel to one another and concentrated on a point at infinity.

As obvious from foregoing, the magnetic flux caused in the air gap 29 can be increased in the energizing period when the ratio L/R takes the value in the range between 0.25 and 6.0 or when the distance L and the mean radius R of curvature are so set as to fulfill the expression, $0.25 \times R \leq L \leq 6.0 \times R$. Consequently, the driving torque can be increased, so that the motor size reduction and improvement in the motor efficiency can be achieved. In the fourth embodiment, too, each permanent magnet 28 may have the same shape and arrangement as shown in FIG. 5.

Figure 10:
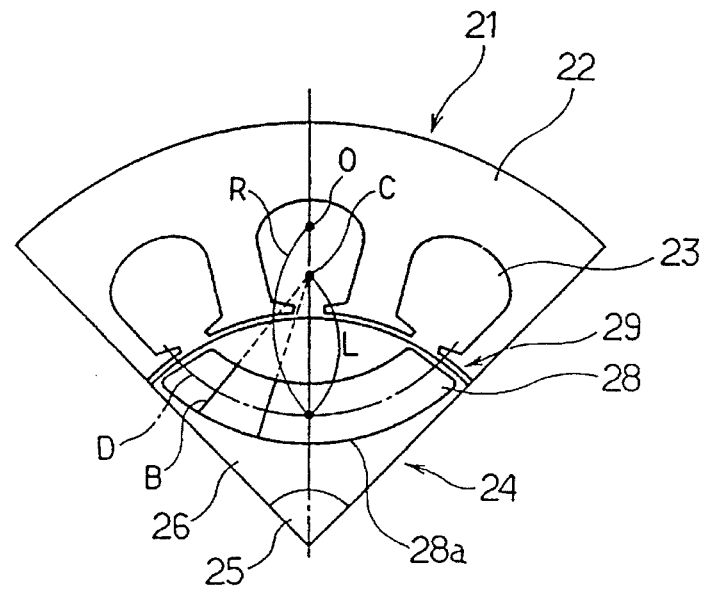
FIG. 10 is a view similar to FIG. 1 showing a fifth embodiment of a permanent magnet motor in accordance with the present invention.
Figure 11:
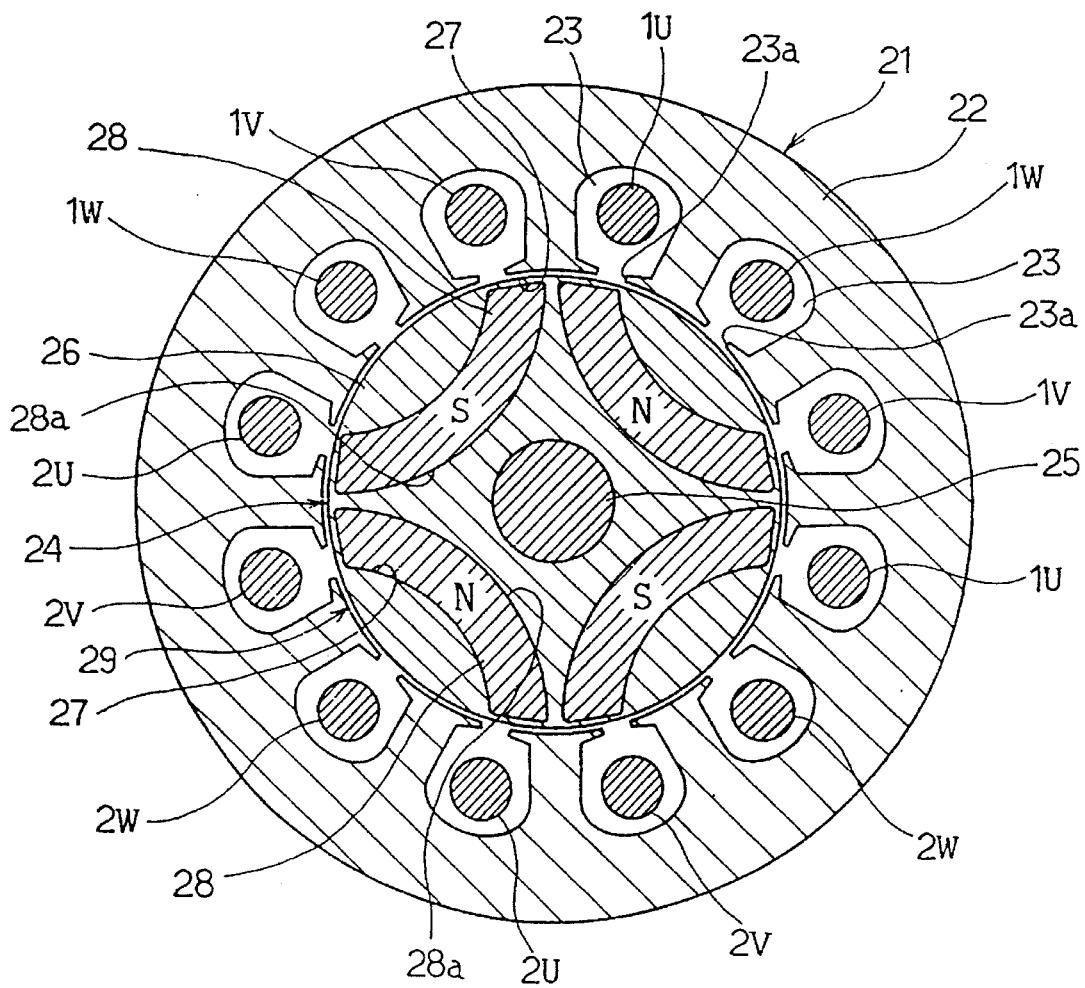
FIG. 11 is a view similar to FIG. 2 showing the permanent magnet motor of the fifth embodiment.
Figure 12:
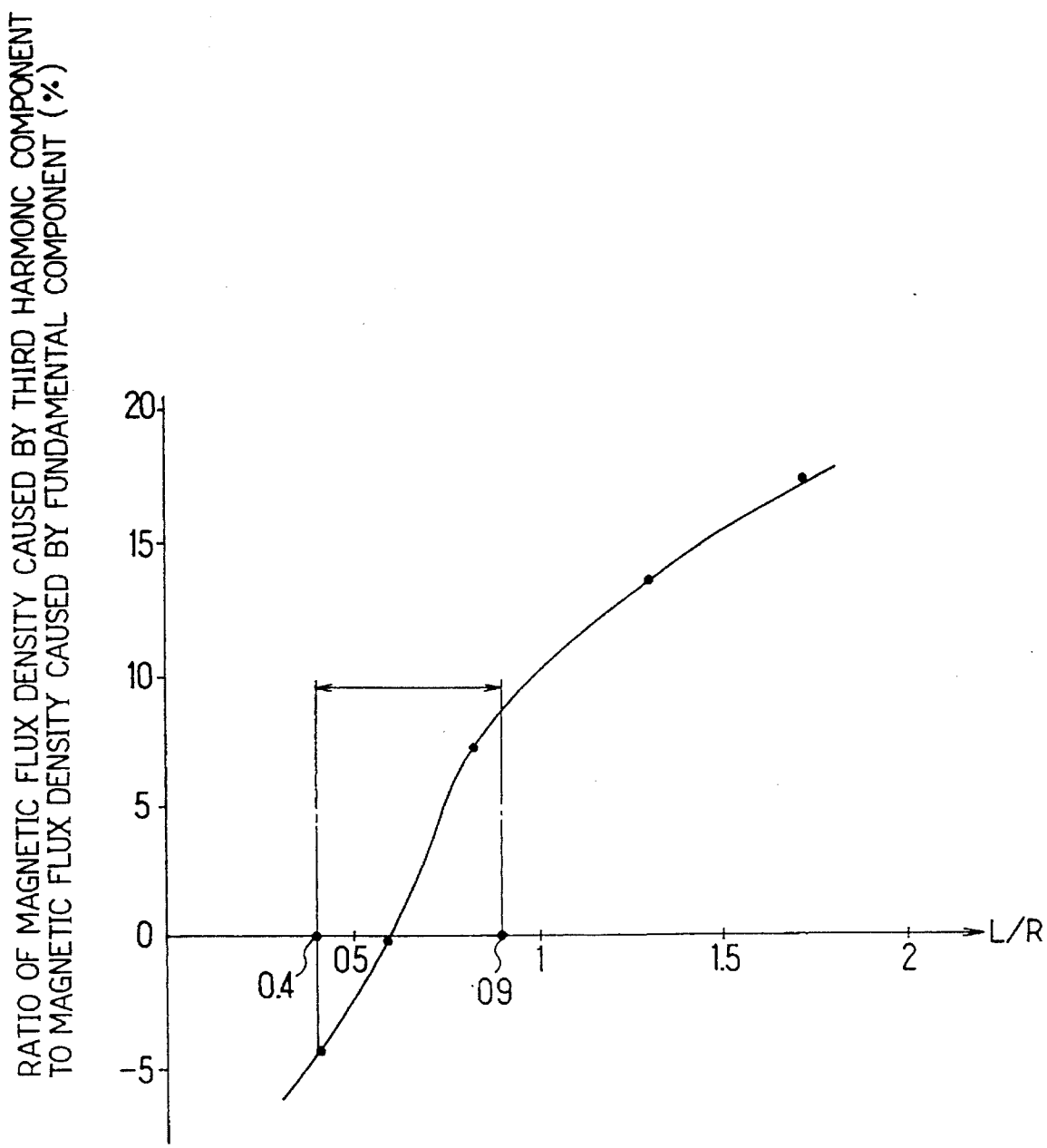
FIG. 12 is a graph showing the relation between the ratio L/R and a ratio of the magnetic flux density caused by the third harmonic component to the magnetic flux density caused by the fundamental component.
Figure 13:
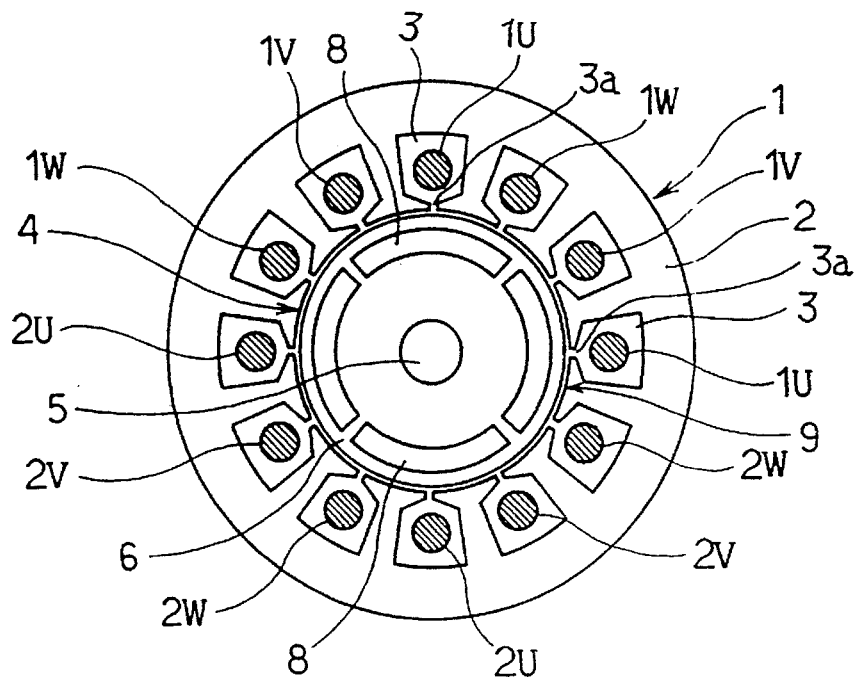
FIG. 13 is a longitudinally sectional view of an assembly of a stator and a rotor in a conventional permanent magnet motor.
Figure 14:
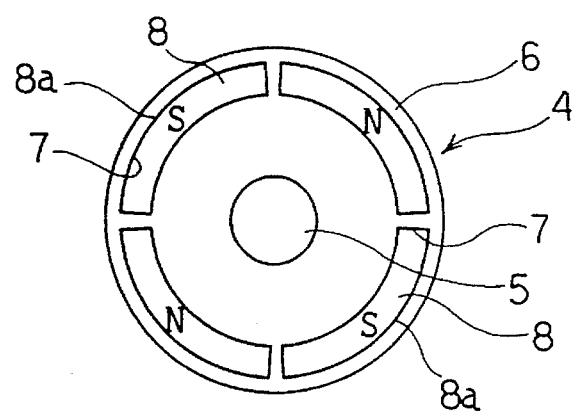
FIG. 14 is a side view of the rotor employed in the conventional permanent magnet motor.
Figure 15:
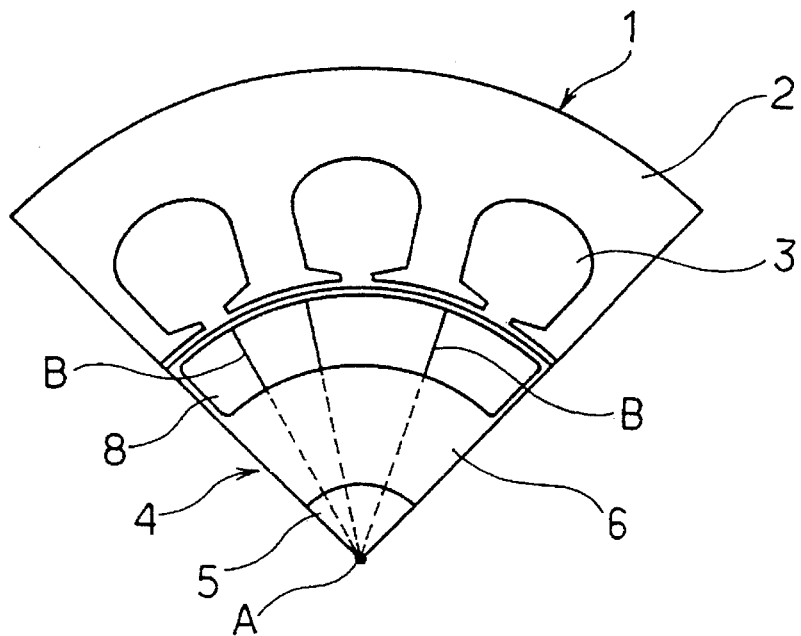
FIG. 15 is a diagrammatic view of the stator and the rotor for showing the distribution of the directions of easy magnetization of the permanent magnet in the prior art.
Figure 16:
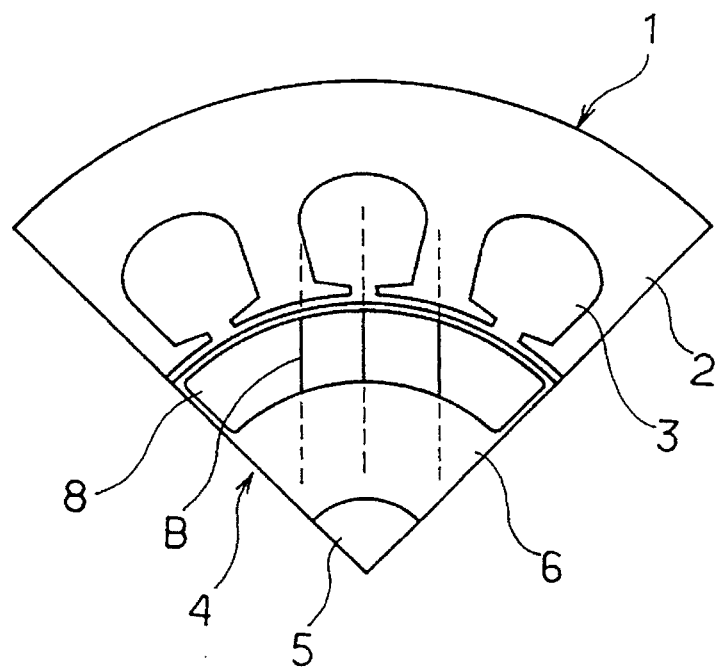
FIG. 16 is also a diagrammatic view of the stator and the rotor for showing the distribution of different directions of easy magnetization in the prior art.

FIGS. 10 to 12 illustrate a fifth embodiment of the invention. In the fifth embodiment, the distance L between the point C and the center line D passing the center of each permanent magnet 28 in the direction of the thickness thereof and the mean radius R of curvature of the permanent magnets 28 are so set as to fulfill the expression, $0.4 \times R \leq L \leq 0.9 \times R$.

The permanent magnet motor constructed as described above is fed with electric power from the inverter controlled power source (see FIG. 17). The stator windings are sequentially energized in the respective periods of electrical angle of 120 degrees, whereby the rotating magnetic field is induced and resultant magnetic attractive and repulsive forces cause the rotor 24 to rotate.

FIG. 12 shows the relation between the ratio L/R and a ratio of the magnetic flux density caused by the third harmonic component to the magnetic flux density caused by the fundamental component in the air gap 29 in the fifth embodiment. The negative value of the latter ratio shows that the third higher harmonic component is 180 degrees out of phase with the fundamental component. As obvious from FIG. 12, the ratio of the magnetic flux density caused by the third harmonic component to the magnetic flux density caused by the fundamental component can be reduced when the ratio L/R takes the value in the range of 0.4 to 0.9. Accordingly, the higher harmonic component in the flux density caused in the air gap 29 can be decreased when the ratio L/R is so set as to take the value in the range of 0.4 to 0.9 or when the distance L and the mean radius R of curvature are so set as to fulfill the expression, $0.4 \times R \leq L \leq 0.9 \times R$. Consequently, since the magnetic flux density in the air gap 29 can be approximated to a sine wave as far as possible, the so-called cogging torque can be reduced.

According to the fifth embodiment, the higher harmonic component in the magnetic flux density in the air gap 29 is reduced such that the magnetic flux density is approximated to the sine wave as far as possible. Consequently, the higher harmonic energy in the air gap 29 can be reduced and the energy variation due to interaction between the higher harmonic energy and the openings 23a of the slots 23 of the stator core 22 can be restrained. Accordingly, the cogging torque can be reduced and undesirable motor oscillation or noise can be restrained. In the fifth embodiment, too, each permanent magnet 28 may have the same shape and arrangement as shown in FIG. 5.

Although the four permanent magnets are employed in the foregoing embodiments, the number of permanent magnets or the number of poles should not be limited to four.

Furthermore, although the stator core 22 has the twelve slots in the foregoing embodiments, the number of slots should not be limited to twelve. Each permanent magnet may be formed from material other than ferrite. The arc portion of each permanent magnet may be part of an ellipse.

The foregoing disclosure and drawings are merely illustrative of the principles of the present invention and are not to be construed in a limiting sense. Various changes and modifications will become apparent to those of ordinary skill in the art. All such changes and modifications are seen to fall within the true spirit and scope of the invention as defined by the appended claims.

We claim:

1. A permanent magnet motor comprising:
   a) a stator including an annular stator core and a plurality of stator windings wound on the stator core so that a plurality of phases are composed; and
   b) a rotor rotatably mounted with a predetermined air gap between the same and an inner peripheral face of the stator core, the rotor including a rotor core having a plurality of slots and a plurality of permanent magnets embedded in the slots respectively, the rotor being rotated when the stator windings are sequentially energized;
   wherein each permanent magnet has a generally arc-shaped cross section and is embedded in the slot so that a convex portion thereof is directed toward a rotor axis;
   each permanent magnet is magnetized so that directions of easy magnetization thereof are concentrated on a point C at a side of center of curvature thereof;
   the relation between a distance L between the point C and a center line passing the center of each permanent magnet in the direction of the thickness thereof and a mean radius of curvature R of the permanent magnets is shown by the following expression:

$1.8 \times R \leq L \leq 5 \times R$.

2. A permanent magnet motor comprising:
   a) a stator including an annular stator core and a plurality of stator windings wound on the stator core so that a plurality of phases are composed; and
   b) a rotor rotatably mounted with a predetermined air gap between the same and an inner peripheral face of the stator core, the rotor including a rotor core having a plurality of slots and a plurality of permanent magnets embedded in the slots respectively, the rotor being rotated when the stator windings are sequentially energized;
   wherein each permanent magnet has a generally arc-shaped cross section and is embedded in the slot so that a convex portion thereof is directed toward a rotor axis;
   each permanent magnet is magnetized so that directions of easy magnetization thereof are concentrated on a point C at a side of center of curvature thereof;
   the relation between a distance L between the point C and a center line passing the center of each permanent magnet in the direction of the thickness thereof and a mean radius of curvature R of the permanent magnets is shown by the following expression:

$0.4 \times R \leq L \leq 0.9 \times R$.

* * * * *